(12) United States Patent
Campbell

(10) Patent No.: US 10,745,856 B2
(45) Date of Patent: Aug. 18, 2020

(54) METHOD AND APPARATUS FOR PRODUCING A SYNTHETIC TENSILE MEMBER WITH A PRECISE LENGTH AND ENHANCED STABILITY

(71) Applicant: Richard V. Campbell, Havana, FL (US)

(72) Inventor: Richard V. Campbell, Havana, FL (US)

(73) Assignee: Bright Technologies, LLC, Havana, FL (US)

( * ) Notice: Subject to any disclaimer, the term of this patent is extended or adjusted under 35 U.S.C. 154(b) by 291 days.

(21) Appl. No.: 15/616,385

(22) Filed: Jun. 7, 2017

(65) Prior Publication Data

US 2017/0356133 A1 Dec. 14, 2017

Related U.S. Application Data

(60) Provisional application No. 62/347,120, filed on Jun. 8, 2016.

(51) Int. Cl.
| | |
|---|---|
| *D07B 5/06* | (2006.01) |
| *F16G 11/14* | (2006.01) |
| *F16G 11/02* | (2006.01) |
| *D07B 7/02* | (2006.01) |
| *D07B 9/00* | (2006.01) |
| *D07B 1/02* | (2006.01) |

(52) U.S. Cl.
CPC ............... *D07B 5/06* (2013.01); *D07B 7/022* (2013.01); *D07B 9/00* (2013.01); *F16G 11/02* (2013.01); *F16G 11/146* (2013.01); *D07B 1/02* (2013.01); *D07B 2401/2055* (2013.01); *D07B 2501/203* (2013.01); *D07B 2501/2015* (2013.01)

(58) Field of Classification Search
CPC .................................. D07B 5/06; D07B 7/022
See application file for complete search history.

(56) References Cited

U.S. PATENT DOCUMENTS

| 5,290,500 A * | 3/1994 | Ryan ....................... D02J 1/223 |
| | | 264/289.6 |
| 2006/0160435 A1* | 7/2006 | Campbell ............. F16G 11/025 |
| | | 439/878 |

\* cited by examiner

*Primary Examiner* — Christopher M Koehler
*Assistant Examiner* — Kyle A Cook
(74) *Attorney, Agent, or Firm* — J. Wiley Horton

(57) ABSTRACT

A method for producing a synthetic tensile member having a precisely known and stable length. The invention, also comprises equipment configured to carry out the method. A tensile member is prepared by attaching terminations to an assembly of synthetic filaments. The tensile member is then attached to a loading apparatus that subjects the tensile member to a pre-defined loading process. The tensile member is thereby conditioned to a stable length. The length is then measured and a length adjusting component is incorporated into the tensile member to create a precise and stabilized length that is configured for the tensile member's particular application.

4 Claims, 18 Drawing Sheets

METHOD AND APPARATUS FOR PRODUCING A SYNTHETIC TENSILE MEMBER WITH A PRECISE LENGTH AND ENHANCED STABILITY

CROSS-REFERENCES TO RELATED APPLICATIONS

This non-provisional patent application claims the benefit of an earlier-filed provisional application. The first provisional application was assigned Ser. No. 62/347,120. It listed the same inventor.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

This invention relates to the field of tensile strength members such as multi-stranded synthetic cables. More specifically, the invention comprises devices and methods for creating a synthetic tensile member having a fixed and stable length.

2. Description of the Related Art

The term "tensile member" encompasses a very broad range of known devices, including steel rods, helically wrapped wire ropes/cables, fiber ropes/cables, wound slings, rope slings grommets, etc. These devices have for many years been made using steel. For a fixed installation—such as a bridge stay—a relatively rigid rod may be used. For a more mobile or dynamic installations—such as the rigging on the boom of a crane—helically wrapped wire rope may be used. Steel tensile members have been mass produced for over one hundred years and the properties of these tensile members are very well understood. For example, it is well understood how to manufacture a steel tensile member to a precise level of performance and a precise overall length.

Such wire ropes may need to be "set" or "bedded" when they are first assembled. This process involves applying tension to tighten the interwoven nature of the strands within the rope. An initial "stretch" will occur, after which a wire rope remains in the "set" state. Significantly, the amount of set needed is predictable. It is therefore possible to create a wire rope that is "short" by a calculated amount so that when the wire rope is set it will lengthen by a known amount and wind up being the proper length.

A termination must generally be added to a tensile member in order to transmit a load into or out of the tensile member. A terminations is most commonly affixed to the end of a tensile member, though it can be affixed to an intermediate point as well. In this context, the term "termination" means a structure that is affixed to the tensile member (or otherwise caused to become present on the tensile member) to transmit a load to or from the tensile member. The term encompasses solid anchors, soft splices, and round grommet or sling structures. The term also includes terminations that may be incorporated on a subcomponent of a larger tensile member, such as a sub-rope or strand.

As stated previously, wire rope is an example of a steel tensile member. A hook or loading eye is often added to wire rope. The hook or loading eye in this context is a termination. Such prior art terminations on large wire ropes commonly include a socket. A length of the wire rope is placed within the socket and "upset" into an enlarged diameter. The upset portion is then potted into the socket using molten lead or—more recently—a strong epoxy. Once the potted portion solidifies, the end of the wire rope is locked into the socket and the termination is thereby permanently affixed.

In recent years materials much stronger than steel have become available for use in the construction of cables and other tensile strength members. Many different materials are used for the filaments in a synthetic cable. These include DYNEEMA, SPECTRA, TECHNORA, TWARON, KEVLAR, VECTRAN, PBO, carbon fiber, nano-tubes, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is particularly applicable to terminated tensile members made of such high-strength synthetic filaments, for reasons which will be explained in the descriptive text to follow. While the invention could in theory be applied to older cable technologies—such as wire rope—it likely would offer little advantage for that application. Thus, the invention is not really applicable to wire rope and other similar cables made of very stiff elements.

In this disclosure the term "synthetic tensile member" should be understood to encompass a tensile member made primarily of synthetic filaments. However, it should be understood that other traditional constituents (such as metallic strands) may be present in these "synthetic" cables as well. Synthetic tensile member is also intended to apply to subcomponents of larger assemblies or tensile members, such as the sub-rope or strand of a large, rope/cable. Additionally, the terms "rope" and "cable" will be used interchangeably—as they are both common industry terms that apply to nearly all structural materials.

The present invention is applicable to many different types of tensile members (not just cables). However, because cables are a very common application and because the inventive principles will be the same across the differing types of tensile members, cables are used in the descriptive embodiments. Some terminology used in the construction of cables will therefore benefit the reader's understanding, though it is important to know that the terminology varies within the industry and even varies within descriptive materials produced by the same manufacturer. For purposes of this patent application, the smallest individual component of a cable is known as a "filament." A filament is often created by an extrusion process (though others are used). Many filaments are grouped together to create a strand. The filaments are braided and/or twisted together using a variety of known techniques in order to create a cohesive strand. There may also be sub-groups of filaments within each strand. As the overall cable size gets larger, more and more layers of filament organization will typically be added. The strands are typically braided and/or twisted together to form a cable. In other examples the strands may be purely parallel and encased in individual surrounding jackets. In still other examples the strands may be arranged in a "cable lay" pattern that is well known in the fabrication of wire ropes.

The inventive principles to be disclosed may be applied to an individual strand. They may also be applied to an entire cable made up of many strands. Thus, the invention may be applied to a completed tensile member and it may be applied to a component of an overall tensile member before the component is installed into the final assembly.

FIGS. 1-4 provide some background materials to aid the reader's understanding. FIG. 1 depicts a very simple cable 10 that is made of three helically wrapped strands 12. Each strand 12 contains many, many individual filaments. FIG. 2 shows the cable of FIG. 1 with a termination 36 attached. Anchor 18 in this example is a radially symmetric component with an expanding central passage 19. A length of the cable is placed in this expanding internal passage and splayed apart. Potting compound is introduced into the passage in a liquid state. The potting compound is any substance which transitions from a liquid to a solid over time (such as an epoxy). The potting compound hardens to form potted region 20. Once the potted region is formed, anchor 18 is locked to the end of cable 10 and a termination 36 is thereby created.

In other examples the cable will be locked to the anchor without the use of a potting compound. Those skilled in the art will know that frictional devices (such as a "spike-and-cone" system) can be used to lock the anchor to the cable). In still other examples the anchor will be formed as a splice in which an end of the cable is formed into a loop and woven back into itself.

FIG. 3 provides an example with a more complex organization. Cable assembly 30 includes three individual cables 10 within an encompassing jacket 28. An anchor 18 is affixed to the end of each cable 10. Collector 22 includes three receivers 26—each of which is configured to receive an anchor 18. The anchors are connected to collector 22 and a load transferring feature 24 (shown using hidden lines) transfers tension from collector 22 to an external component.

FIG. 4 shows another example using three parallel cables 10. Each cable 10 includes a termination 36. The three terminations 36 are connected to loading block 32 using a pin joint. This example illustrates the need for uniformity and predictability of the length of the three cables. If one of the cables is slightly shorter, it will carry a disproportionate higher share of the overall load.

Producing synthetic tensile members with a consistent and predictable overall length is presently a serious industry challenge. The problems result from one or more of the following factors:

1. The mechanical properties of synthetic filaments vary from batch to batch. While this is true of more traditional materials, the variance is synthetic materials is much greater;

2. Most strands or cables must be created by braiding together thousands to millions of individual synthetic filaments. Two braiding or interweaving machines may appear to produce a similar result but in fact the properties will vary;

3. There are many steps in fabricating a completed cable assembly using synthetic filaments. Each step introduces additional variations and these variations tend to accumulate;

4. Synthetic filaments must generally be elastically bent and interwoven during the manufacturing process. These filaments have a low coefficient of friction, and since they are not stiff they are designed to move and "bed" during use. This bedding or setting process changes both the mechanical properties of a cable as a whole (such as the modulus of elasticity) and the overall length;

5. Synthetic filaments are temperature sensitive. This fact affects stillness and length in the normal working range; and 6. The addition of a termination to a cable end introduces a considerable slip variable ("setting" or "bedding") when the cable assembly is first loaded. This variable increases the overall cable length, but the amount of increase has proved to be unpredictable. This is especially the case with friction or grip based termination methods, such as a splice (which is the most common method of synthetic cable termination).

All these issues tend to grow more significant as a cable assembly increases in length, strength, and complexity. It is difficult to predict the behavior of larger tensile members due to the accumulation of manufacturing tolerances for all the subcomponents. Further, it may be some time before the length becomes stable as the length of some cable assemblies may continue to grow under tension as the interworking elements stabilize. If such a tension member is combined in parallel with other tension members, an uneven distribution of the overall load results.

For these reasons, it is not presently common to use synthetic cables where a precise length or stability is important. Exemplary applications include large crane boom stays, bridge stays, and multi-point lifting slings or multi-cable bridle assemblies. Because of the enormous loads involved, it is common to use a parallel assembly of four or more cables in these applications.

There are length-adjusting mechanisms known in the prior art. One example is a large turnbuckle. It is rarely practical to include such a large and heavy item. Further, a turnbuckle does not remedy the concerns of length or load stability unless it is periodically readjusted (A turnbuckle must be initially tensioned and then periodically re-tensioned as the cable "sets"). A suitable turnbuckle will also require a substantial torque to adjust, and it is often difficult to apply such a large amount of torque in the field. One may imagine a turnbuckle on a dragline crane that is 50 meters in the air. Adjusting such a turnbuckle would not be easy. Further, an improper adjustment may permanently damage the boom if not properly matched with adjustments to the other cables.

The present invention seeks to remedy both the problem of length consistency and the problem of length stability. The invention solves these problems across all types of synthetic filament-based tensile members and termination methods—without the need for a field adjustment device.

BRIEF SUMMARY OF THE PRESENT INVENTION

The present invention comprises a method for producing a synthetic filament tensile member having a precisely known and stable length. The invention also comprises equipment configured to carry out the method. A tensile member is prepared by attaching terminations to an assembly of synthetic filaments. The tensile member is then attached to a loading apparatus that subjects the tensile member to a pre-defined loading process. The tensile member is thereby conditioned to a stable length. The length is then measured and a length adjusting component is added to the tensile member (or a suitable modification is made to the tensile member) to create a precise length that is configured for the tensile member's particular application.

REFERENCE NUMERALS IN THE DRAWINGS

Figure 1:
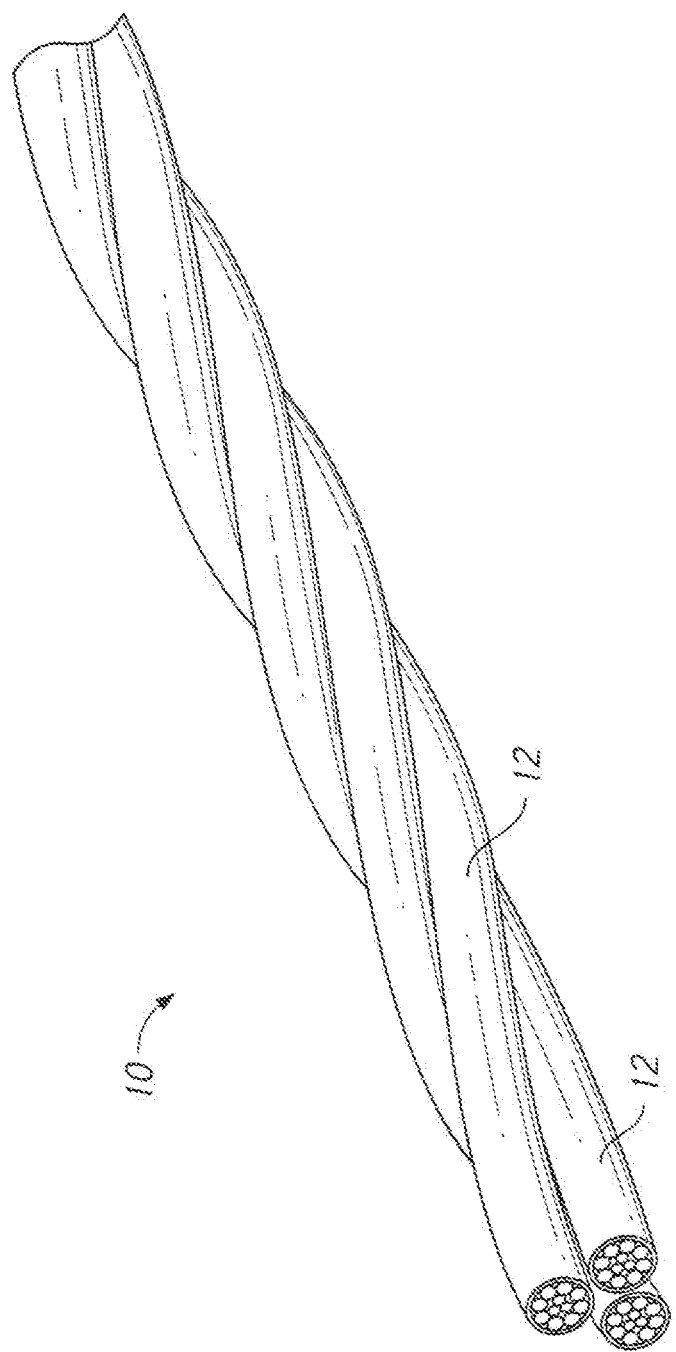
FIG. 1 is a perspective view, showing a prior art cable made of three wrapped strands.
Figure 2:
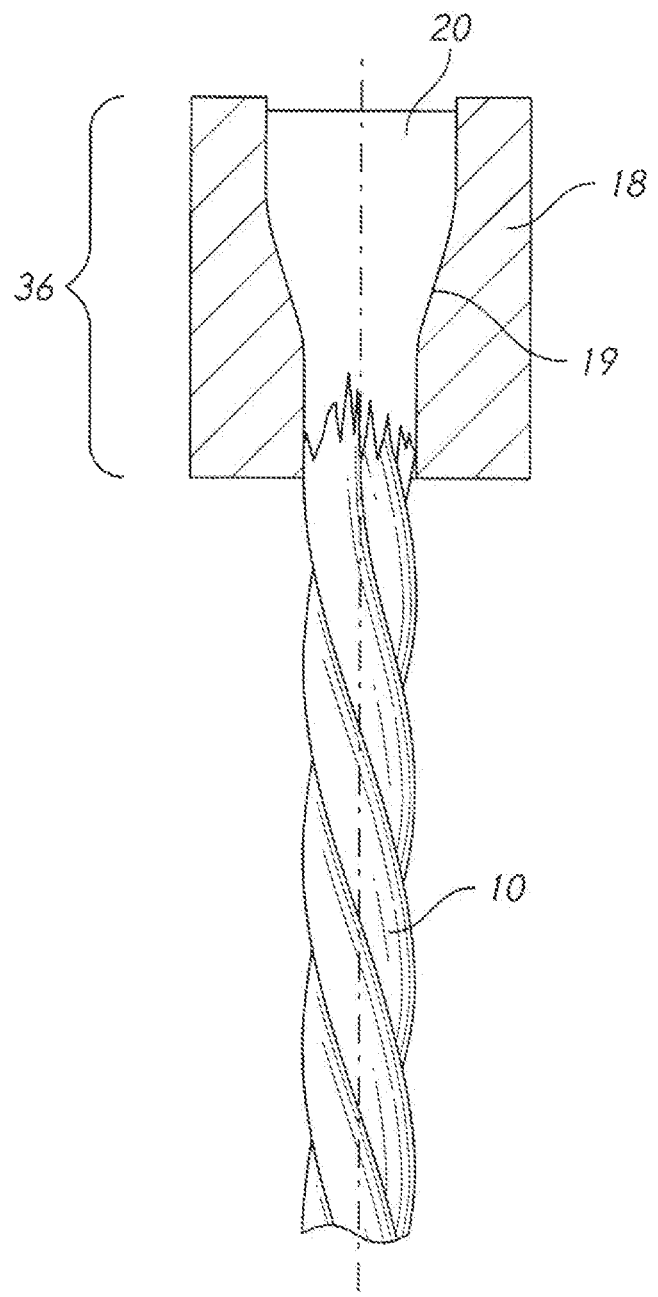
FIG. 2 is a sectional elevation view, showing one way in which a termination can be attached to a cable.

10 cable
12 strand
18 anchor
19 passage
20 potted region
22 collector
24 load transferring feature
26 receiver
28 jacket
30 cable assembly
32 loading block
34 parallel assembly
36 termination
38 loading fixture
40 static fixture
42 extension link
44 first cross bore
45 first attachment reference
46 second cross bore
47 second attachment reference
48 tang
50 pin
52 first clevis
54 second clevis
56 extended tang
58 reference axis
60 cross bore
62 thimble
64 strands
66 jacket
68 thimble block
70 threaded shaft
72 extension bushing
74 mating surface
76 bearing surface
78 through bore
80 fusion
82 eye
84 cross bore
86 plug
88 offset cross bore
90 spliced eye
92 bushing half
94 correction block
96 overhang

DETAILED DESCRIPTION OF THE INVENTION

A cable made according to the present invention will generally have a first termination on its first end and a second termination on its second end. The first termination will have a first attachment reference—such as the center axis of a first cross bore through the first termination. The second termination will likewise have a second attachment reference—such as the center axis of a second cross bore through the second termination.

Figure 4:
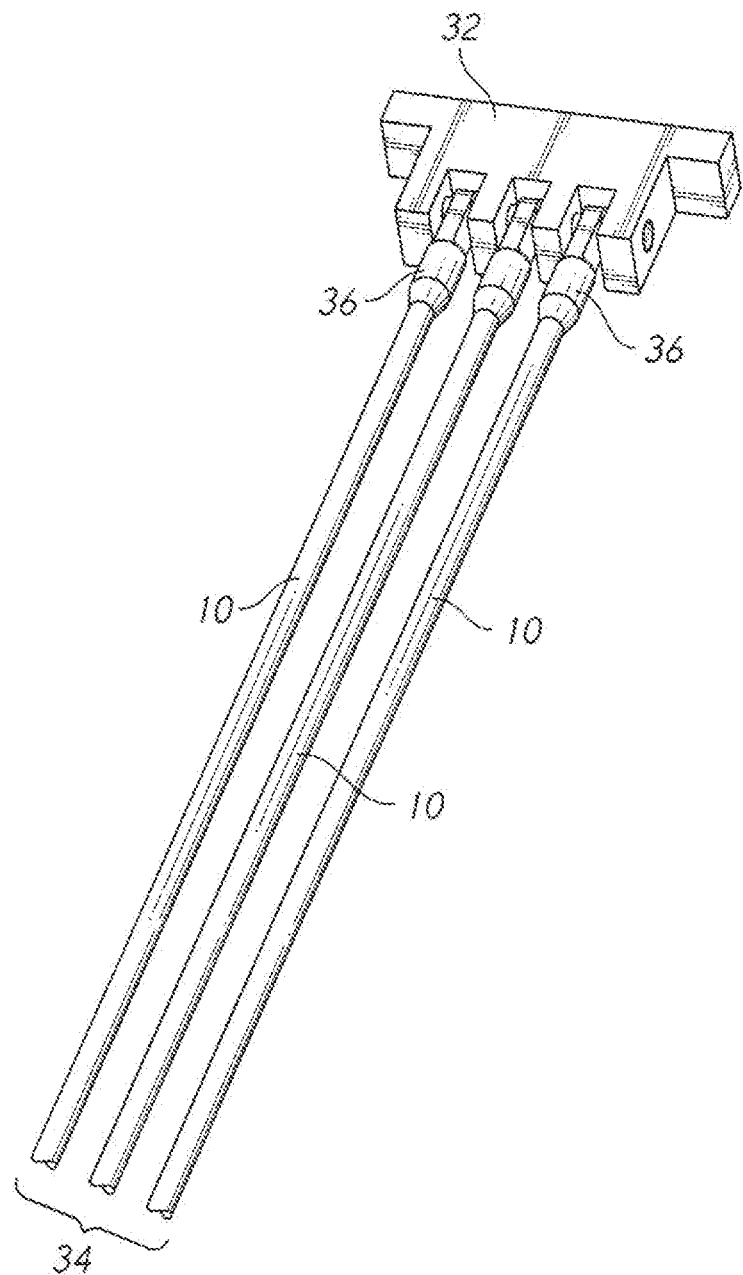
FIG. 4 is a perspective view, showing a parallel cable assembly.

Returning to FIG. 4, those skilled in the art will know that the parallel assembly of three cables will typically have a loading block 32 or analogous anchoring component on each end. The example shown uses a large transverse pin joint to connect the terminations 36 to the loading block 32. For this particular installation, there is a known distance between the pin joint axis on the loading block 32 shown and the pin joint axis on the loading block on the opposite end of the cables. The cables must match this known distance in order to be correctly installed. In other words, the distance between the first and second attachment references on the cables must be equal to the known distance.

Figure 5:
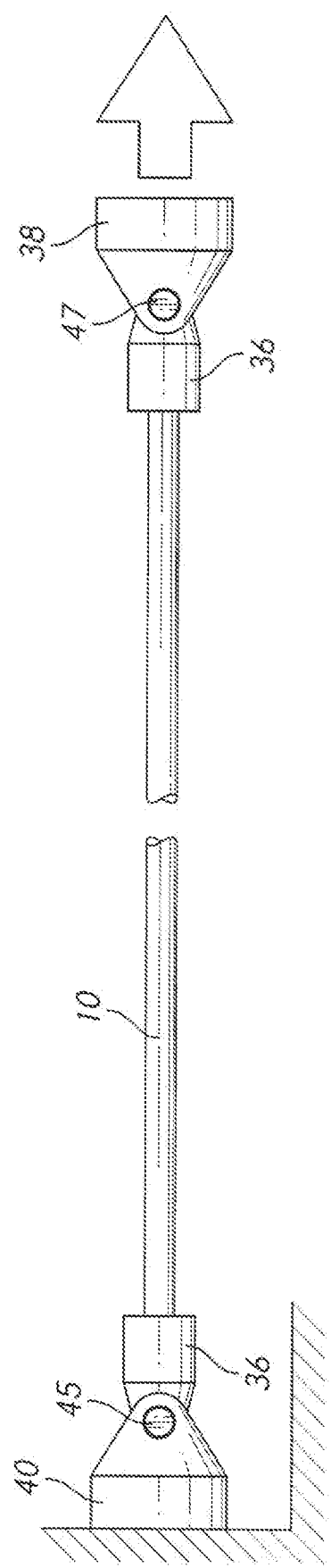
FIG. 5 is an elevation view, showing a tensioning rig employed in the present invention.

FIG. 5 shows a synthetic cable assembly created by adding a termination 36 to each end of cable 10. The first termination is connected to static fixture 40. First attachment reference 45 on the first termination is the center line of a pin joint used to attach the first termination to the static fixture (Note that the first attachment reference could be at some other point along the assembly and need not coincide with the attachment point).

The second termination is attached to loading fixture 38. A predetermined tension profile is then applied through loading fixture 38. Second attachment reference 47 on the second termination is the center line of a pin joint used to attach the second termination to loading fixture 38 (Note that the second attachment reference could be at some other point along the assembly and need not coincide with the attachment point).

This tension profile may assume many forms, but it is preferable to include a pull test to a higher load than is anticipated in the end-use application. Where practical, it is also preferable to include multiple pulls to better condition the cable.

Figure 18:
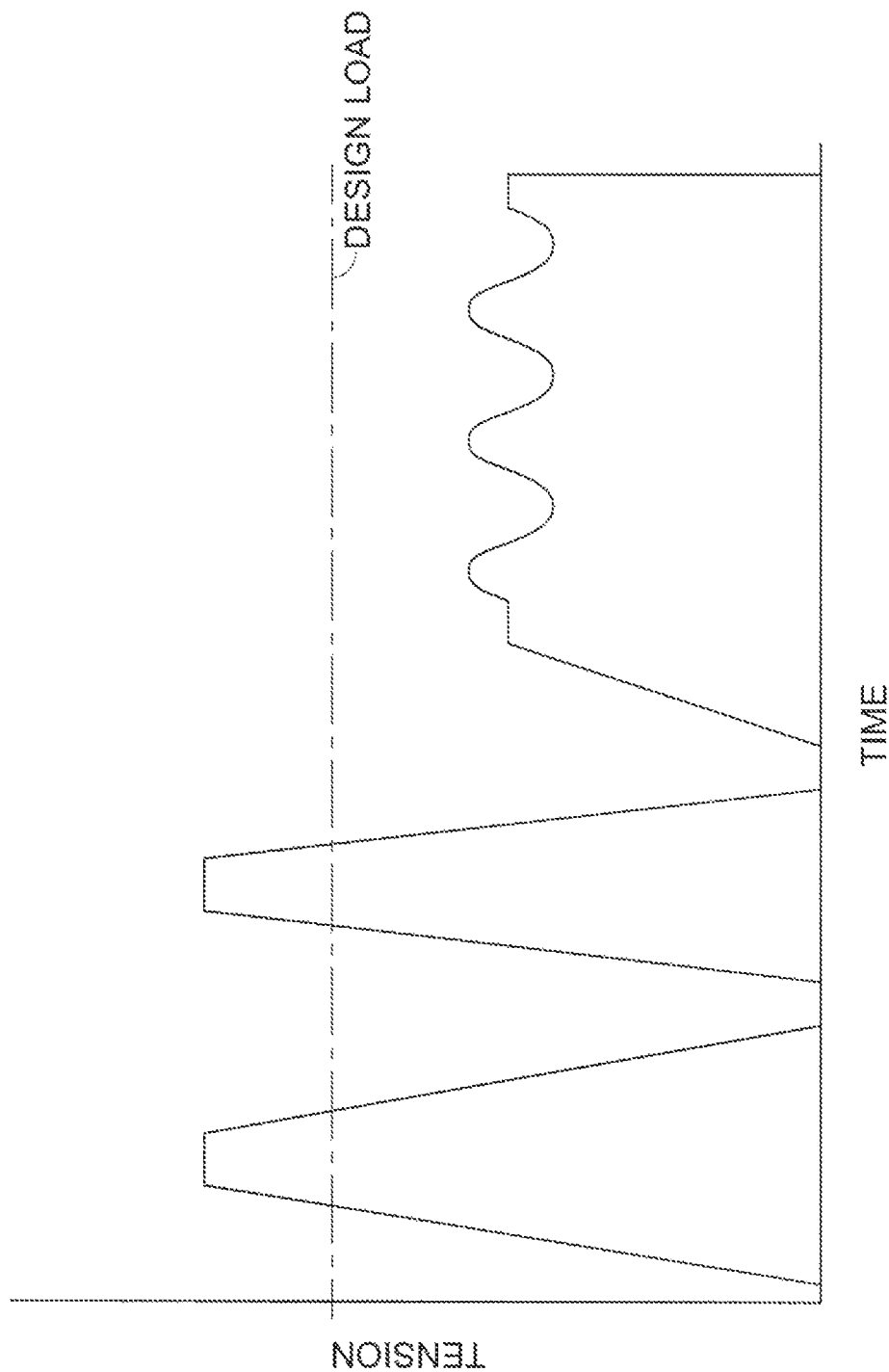
FIG. 18 is a plot showing applied tension over time.

FIG. 18 depicts an exemplary tension profile. The "design load" represents the maximum tension the cable assembly is expected to see in its upcoming installation. In this example, two ramped "pulls" are made to a level exceeding the design load by 20%. A third pull is established with a sinusoidal component applied over an extended period. With some fiber types, it is also beneficial to hold a load for a defined period so that the fibers will permanently elongate and better distribute the load.

The tension profile is configured to fully "bed" ("set") both the terminations and the lay of the cable itself. The length of the overall assembly will tend to extend for some period and then stabilize. Once the length has stabilized, the distance between the first attachment reference on the first termination and the second attachment reference on the second termination is determined. Two carefully pre-cut and terminated cable assemblies may have lengths that are very nearly the same. However, the length variation will tend to grow with the bedding process.

This step may be accomplished in many ways. As one example, if the first and second attachment references are simple cross bores through tangs on the terminations, then closely fitted dowels can be placed in these cross bores. The assembly can then be placed under a suitable tension level and the distance between the dowels can be measured.

In many instances it will be desirable to design the cable and terminations so that the bedded cable assembly winds up being a bit short. A length-adjustment component may then be added to bring the overall assembly of the now-stabilized cable to the proper length. There are many ways to provide such a length-adjustment component. The following embodiments illustrate some of these ways.

Figure 6:
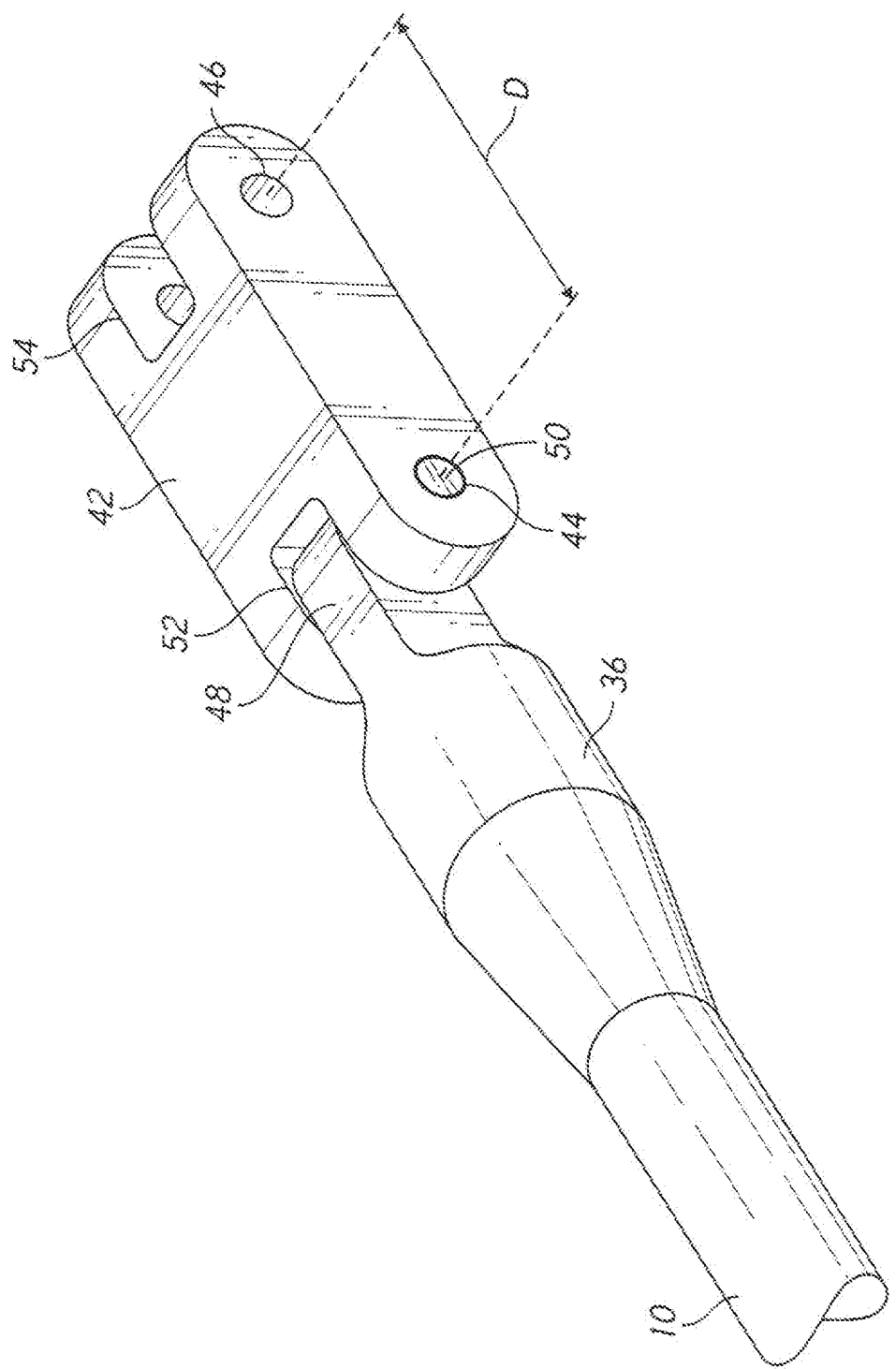
FIG. 6 is a perspective view, showing the addition of an extension link.

FIG. 6 shows a second termination 36 on the second end of cable 10. The termination includes tang 48. A cross bore through the tang is used to attach the termination. The central axis of this cross bore is the second attachment reference used to determine the overall length of the cable assembly.

Extension link 42 is provided to increase the effective length of the cable assembly. The extension link includes first clevis 52 and second clevis 54. The extension link also includes first cross bore 44 and second cross bore 46. First cross bore 44 is aligned with the cross bore in tang 48 and pin 50 is inserted to connect the extension link to the second termination. Second cross bore 46 is offset a distance "D" from first cross bore 44. In this example the second cross bore 46 becomes a third attachment reference. If one then measures the distance from the first attachment reference (on the opposite end of the cable) and the new third attachment reference created by the presence of second cross bore 46, the overall length of the cable will be increased.

To improve accuracy, it is preferable to take the length measurements while the cable assembly is under a fixed reference load. The reference load is preferably as close as possible to the load anticipated for the end-use application.

The process as applied in this exemplary embodiment may then be summarized as follows:

1. A known distance is the target value needed for the cable's desired installation at the anticipated reference load;
2. The cable is created with an overall length that is marginally too short for the known distance and defined reference load;
3. The cable undergoes the setting process depicted in FIG. 5;
4. The distance between the first and second attachment references is accurately determined;
5. An offset distance between the second attachment reference and a desired third attachment reference is calculated; and
6. An extension link 42 of suitable length is manufactured (or possibly pulled from inventory) and attached to the second termination, where the extension link provides the additional distance needed for the cable to have the correct overall length.

Using exemplary numbers, the known distance for a particular installation is 30.260 meters. Once manufactured and set (as depicted in FIG. 5), the distance between the first and second attachment references is carefully measured to be 29.900 meters. An extension link is manufactured where the distance "D" between the first and second cross bores 44, 46 is 0.360 meters. This extension link is then installed as shown in FIG. 6. The cable assembly thus made now has the exact length desired (30.260 meters). And, the length is stable as the cable assembly has already been properly set. In this way countless assemblies can be created to exacting specification with a length that is stable and predictable over time.

Figure 7:
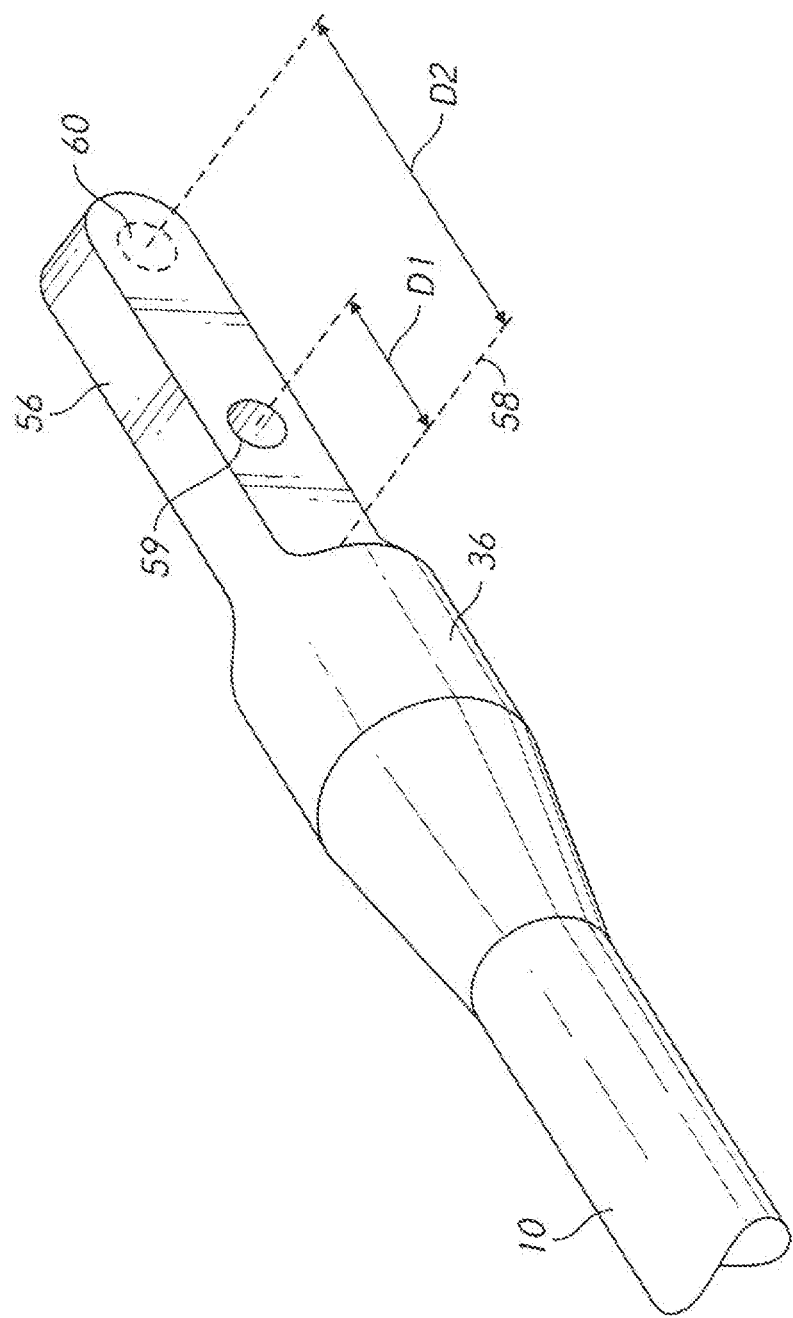
FIG. 7 is a perspective view, showing the use of an extended tang.

FIG. 7 provides another embodiment in which the second termination 36 is provided with an extended tang 56. Loading cross bore 59 is provided so that the cable assembly can be attached to loading fixture 38 (as depicted in FIG. 5). Once the loading process has been used to set the cable and its terminations, a second cross bore 60 is created in extended tang 56. In this example, both loading cross bore 59 and cross bore 60 are located with respect to reference axis 58. The cable is again manufactured a bit short. Cross bore 60 is offset by a distance (D2−D1). Cross bore 60 then becomes the desired third attachment reference and provides the correct overall length for the cable.

Figure 8:
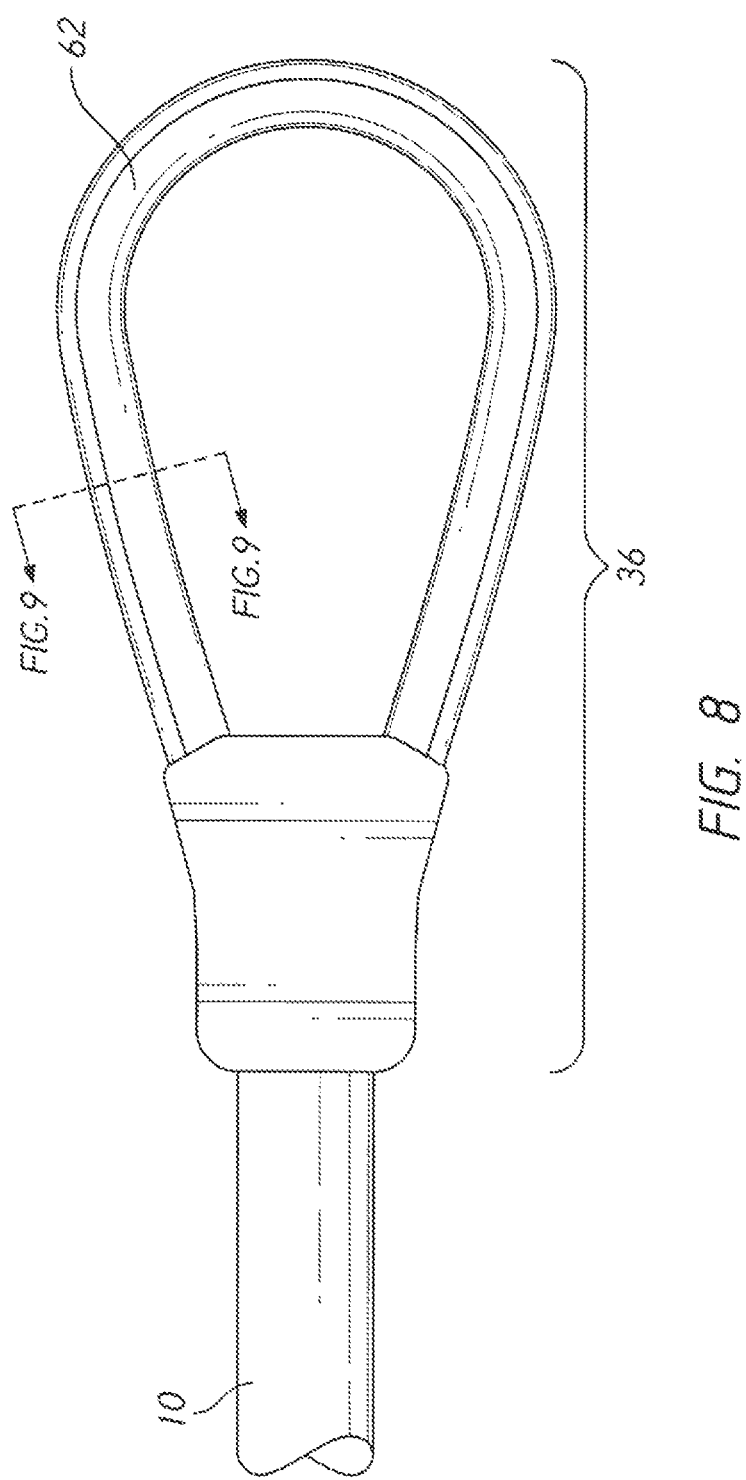
FIG. 8 is an elevation view, showing a splice-based termination.

FIG. 8 shows a second termination 36 made using a splice. A splice involves passing a length of cable around a thimble 62 and then weaving it back on itself. Such a termination can be very strong. However, because the interweaving is a highly-skilled manual process, it introduces considerable uncertainty regarding the final length of the cable following the setting process depicted in FIG. 5. While generally improved, similar process variation challenges are also involved in round slings, grommets, reeved cable block tension members, or wound slings. These types of looped tensile members will commonly include a thimble of some sort for support of high loads.

Figure 9:
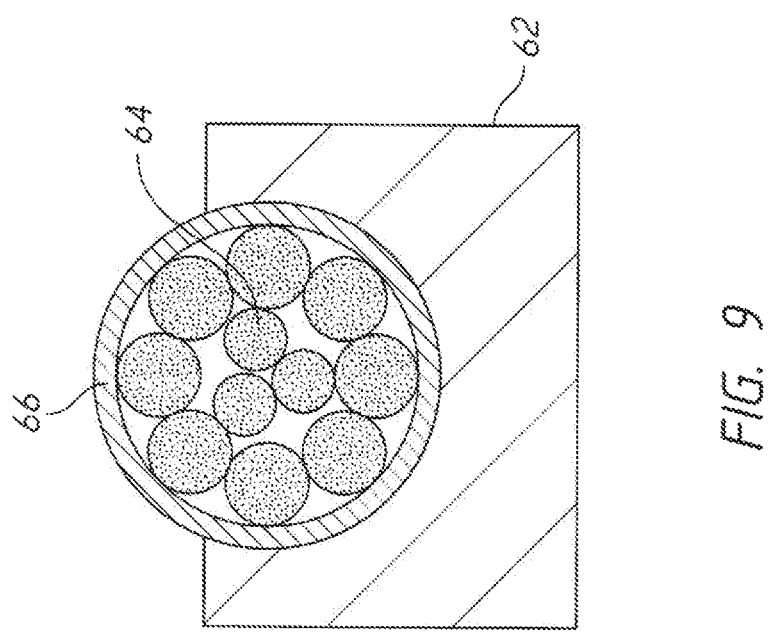
FIG. 9 is a sectional view, showing the nature of the thimble used in the splice-based termination of FIG. 8.

FIG. 9 depicts a cross section through thimble 62. The reader will note how the thimble in this example includes a concave channel configured to receive the cable strands 64 (and jacket 66 in this ease). The inward facing surface of thimble 62 is planar. In many cases thimble 62 may simply be a pulley or sheave configuration with a central cross bore.

Figure 10:
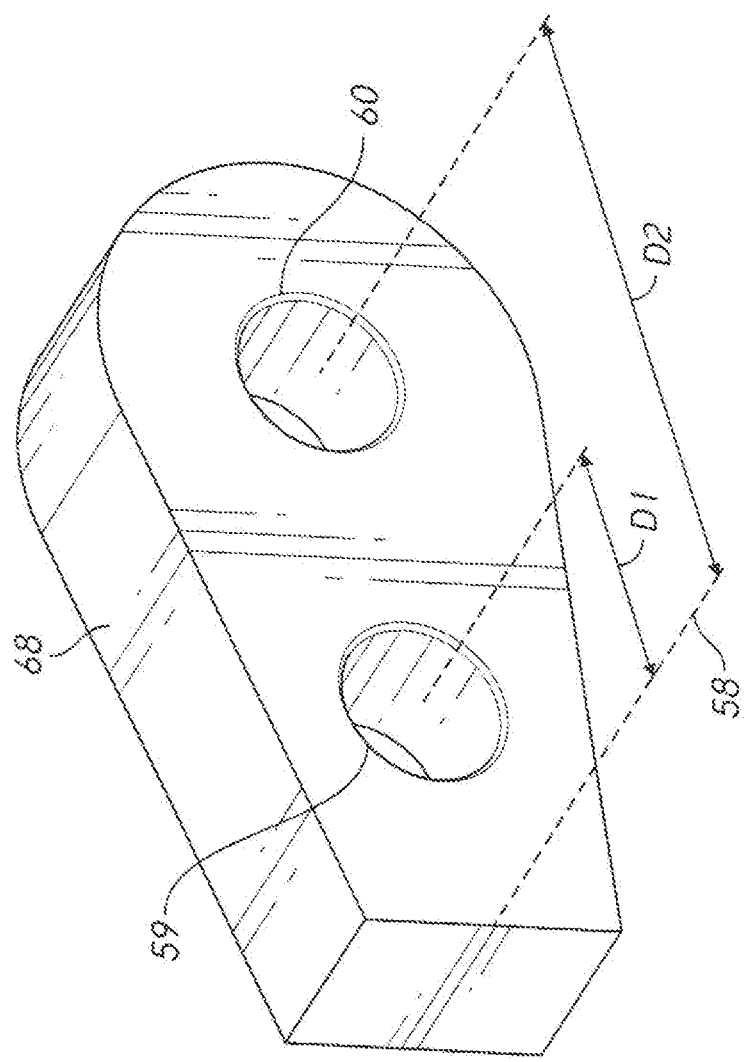
FIG. 10 is a perspective view, showing a thimble block.

FIG. 10 depicts thimble block 68, which is configured to slide laterally into the thimble. When the thimble block is installed within the middle portion of the thimble, loading cross bore 59 allows the cable assembly to be set as shown in FIG. 5. Once a stable length is achieved a distance between the first and second attachment references is determined. An additional length required for the cable is determined. Cross bore 60 is then created in the thimble block. The additional length needed will be equal to (D2−D1) in the depletion of FIG. 10. Cross bore 60 then becomes the desired third attachment reference.

Figure 11:
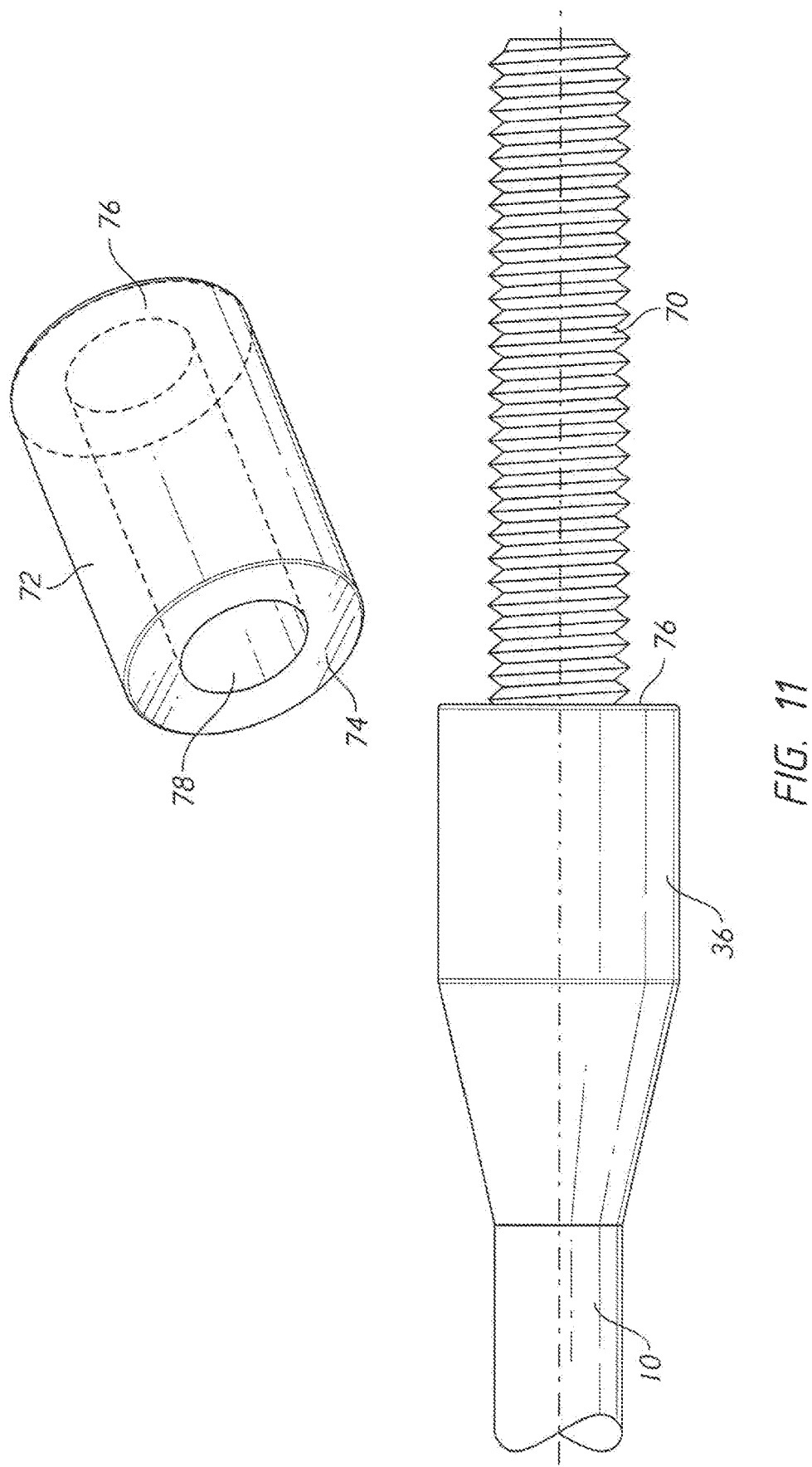
FIG. 11 is an elevation and perspective view, showing a termination having a threaded shaft and an extension bushing.
Figure 12:
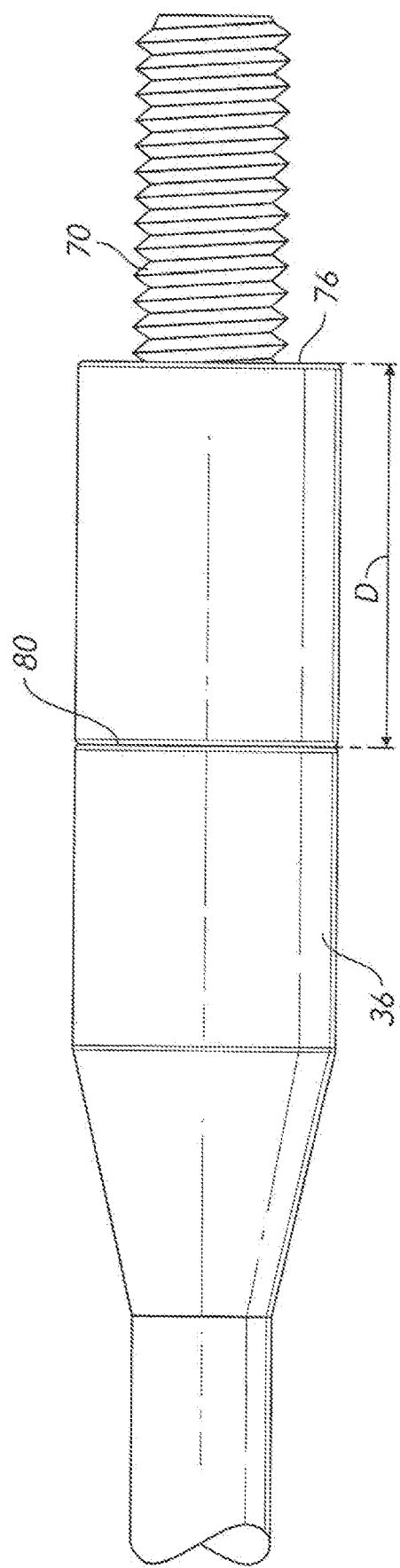
FIG. 12 is an elevation view, showing the placement of the extension bushing on the threaded shaft.

Up to this point the second and third attachment references have been the centerlines of cross bores. This will not always be the case, as there are many different components used to attach terminations to external components. FIGS. 11 and 12 illustrate a different approach.

The second termination 36 in this example includes a long threaded shaft 70. The cable assembly is attached to an external object by passing threaded shaft 70 through a hole in a thick steel plate and then threading a nut onto the exposed end of the threaded shaft. The nut is then tightened. Bearing surface 76 on termination 36 provides the desired second attachment reference.

In this example—once the cable assembly is set as shown in FIG. 5—the cable assembly's length is again too short. Extension bushing 72 is provided to address this problem. Extension bushing 72 has mating surface 74 and bearing surface 76 on its opposite end. It also includes through bore 78. Through bore 78 is slipped over threaded shaft 70 and mating surface 74 on extension bushing 72 is mated to bearing surface 76 on termination 26.

The mated assembly is shown in FIG. 12. Bearing surface 76 has thereby been extended by the distance "D" to form the desired third attachment reference. The two mating surfaces may be joined by adhesives, welding, or some other suitable method to create fusion 80. The termination and the extension bushing thereafter behave as one integrated part. Where possible, it is desirable for the length adjustment part to be permanent. The purpose of the fusion is simply to provide this permanence.

Figure 13:
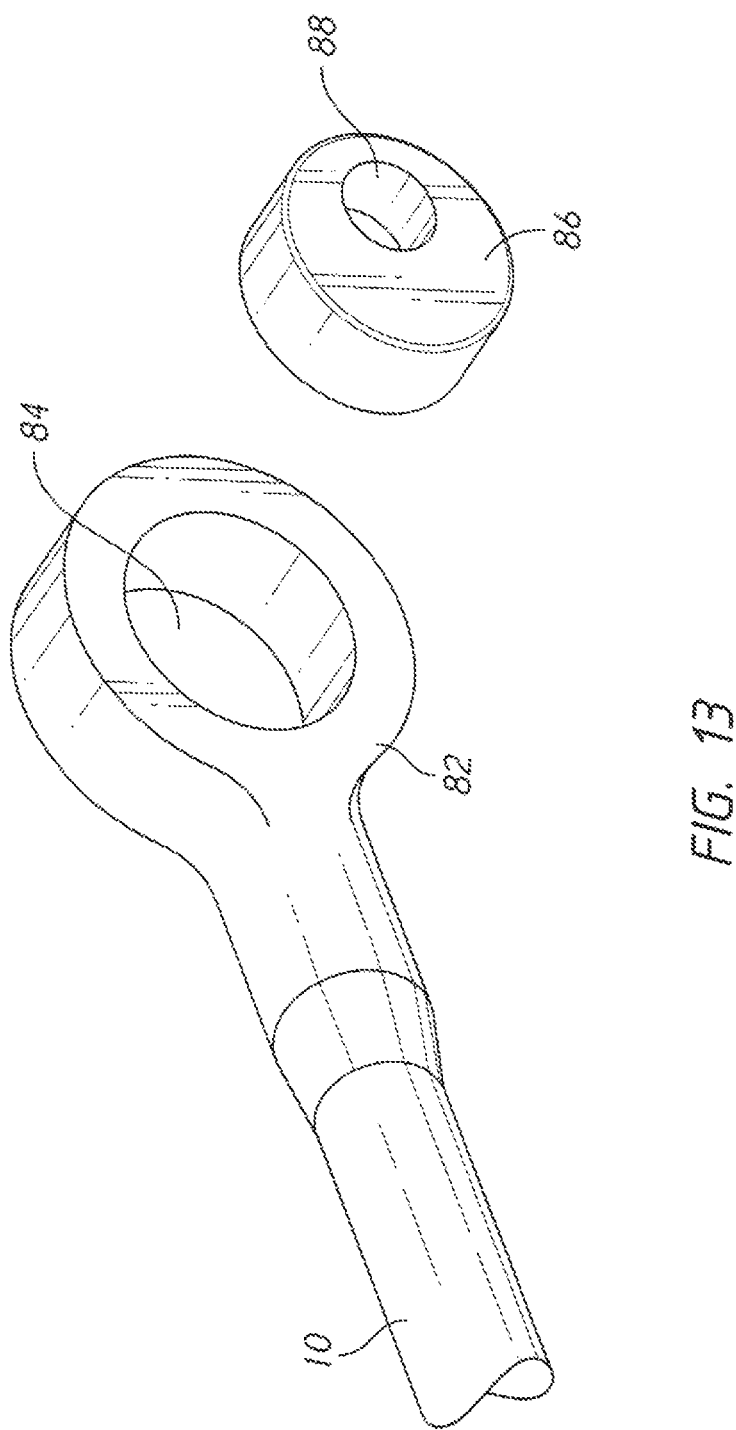
FIG. 13 is a perspective view, showing the use of a plug in a loading eye.

FIG. 13 shows a second termination incorporating eye 82 and an enlarged cross bore 84. Plug 86 is configured to slide laterally into cross bore 84. Offset cross bore 88 provides the desired third attachment reference. It is offset from the center of plug 86 an appropriate amount to produce the desired overall length for the cable assembly.

Figure 14:
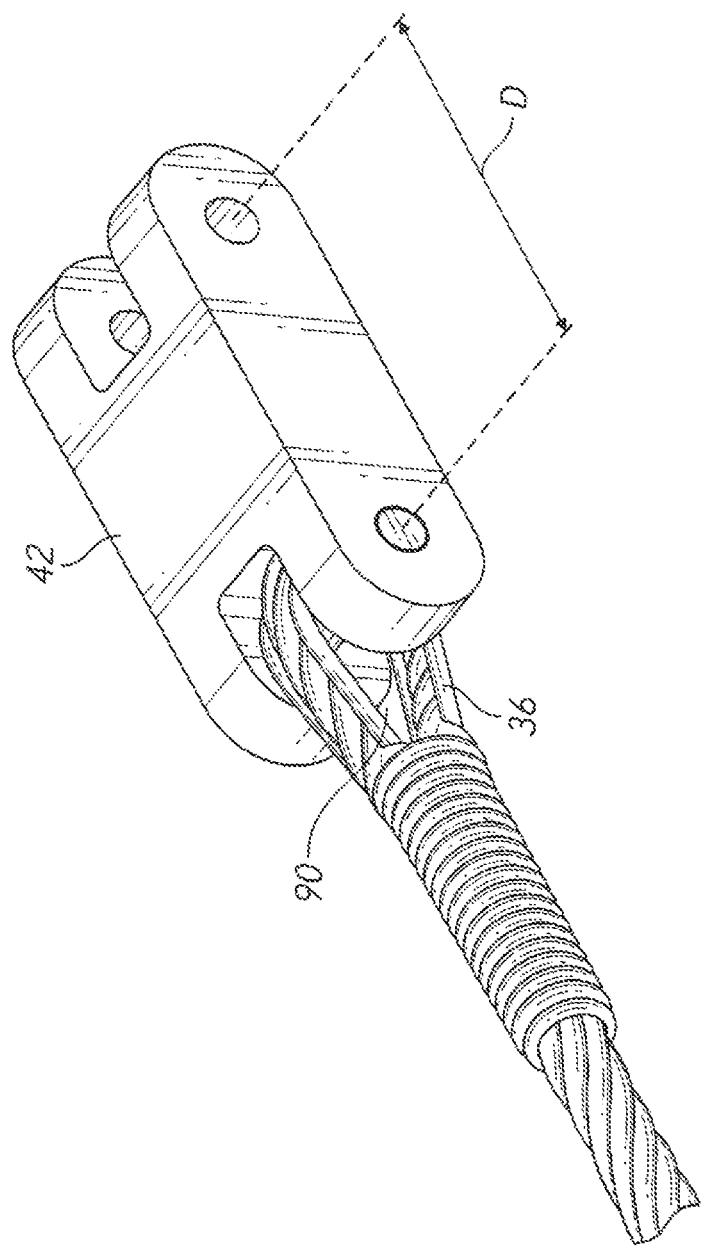
FIG. 14 is a perspective view, showing the addition of an extension link to a spliced termination.

FIG. 14 shows an embodiment where an extension link 42 is added to a spliced type of termination. A length of cable is wrapped around a thimble and woven back into itself to create spliced eye 90. The extension link is connected to this spliced eye by passing a lateral pin through the extension link and the spliced eye.

Figure 3:
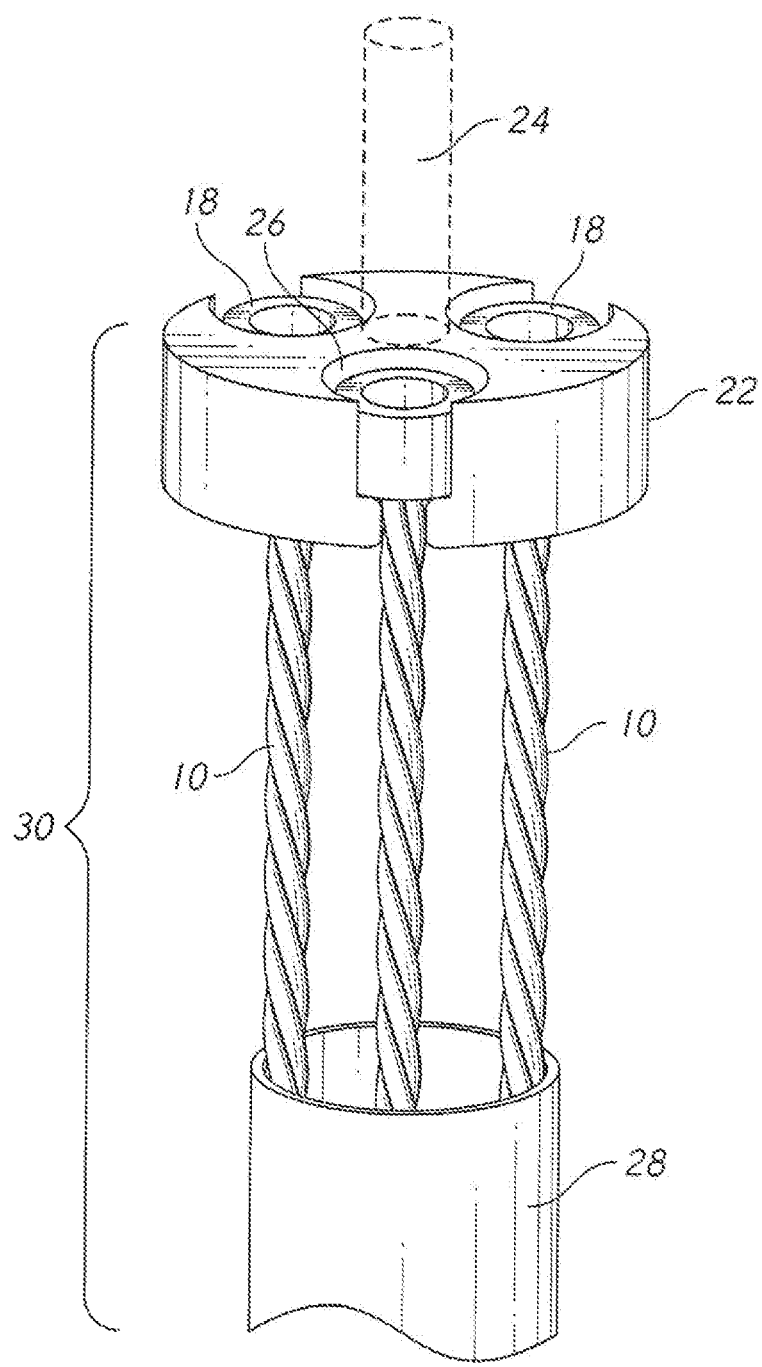
FIG. 3 is a perspective view, showing a cable termination in which multiple anchors are attached to a collector.
Figure 15:
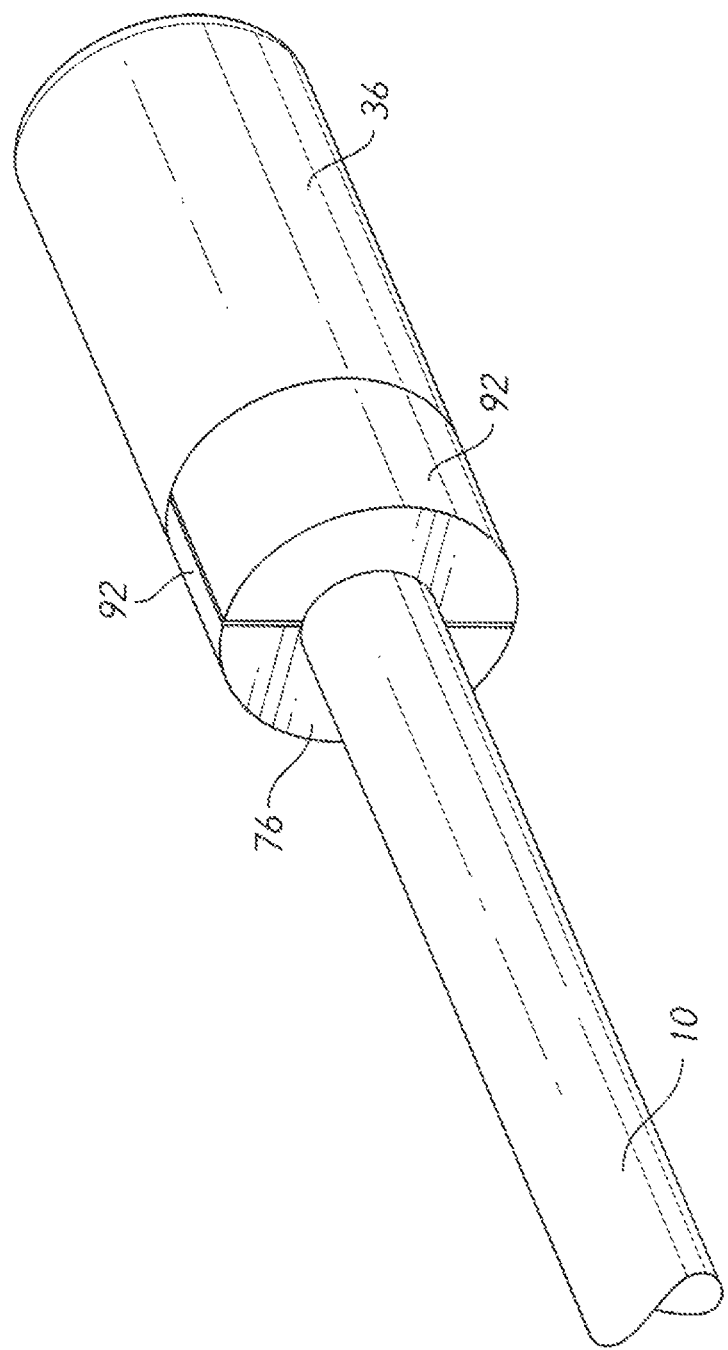
FIG. 15 is a perspective view, showing the use of a compressive bushing.

In the prior examples a cable that was marginally too short was extended by the addition of a length-adjustment component. In other instances the cable will be made marginally too long and the length-adjustment component will need to shorten its effective length. FIG. 15 shows a second termination 36 that includes a planar posterior bearing surface where the cable exits the anchor. In this example two bushing halves 92 have been clamped around the cable up against this posterior bearing surface. The two bushing halves create bearing surface 76—effectively reducing the length of the cable. Bearing surface 76 then becomes the desired third attachment reference. The reader should note that this type of corrective bushing can be added to each of the individual anchors as shown in the example of FIG. 3 in order to apply a length correction to the entire cable (three bushing assemblies would be required for the example of FIG. 3).

Figure 16:
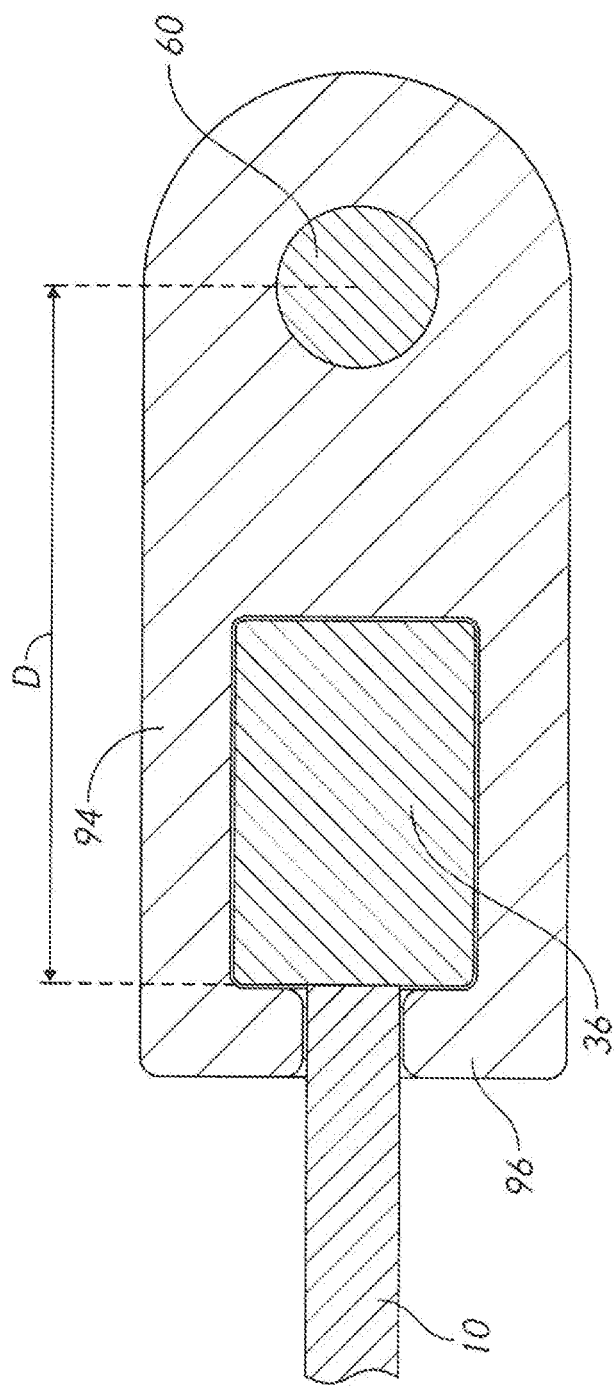
FIG. 16 is an elevation view, showing the use of a correction block.

FIG. 16 shows a length-adjustment component used to increase or decrease the effective cable length for the type of anchor shown in FIG. 15. Correction block 94 includes a cavity to receive termination 36. Overhang 96 abuts the posterior bearing surface on the termination. Cross bore 60 is provided a distance "D" from the posterior bearing surface. Thus, cross bore 60 extends the effective length of the cable assembly and provides the third attachment reference.

Figure 17:
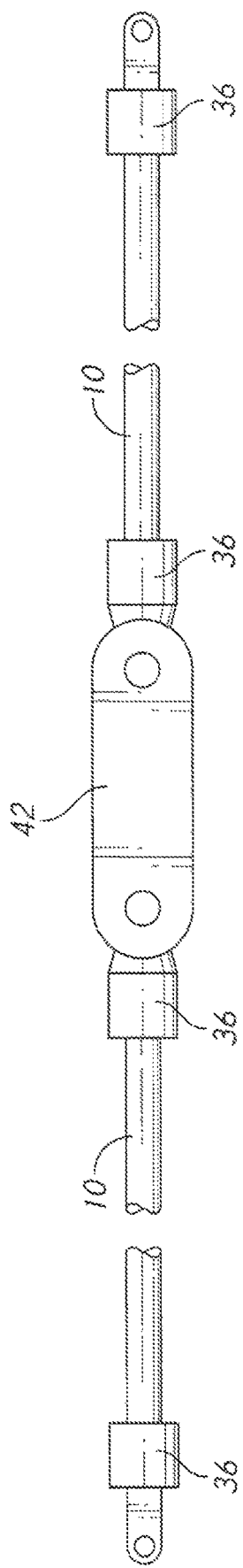
FIG. 17 is an elevation view, showing the use of an extension link in the middle of a cable assembly.

In the preceding examples the length-adjustment component has been added to an end of the cable assembly. It is also possible to add the length-adjustment component to an intermediate location. FIG. 17 shows an embodiment in which a third and fourth termination 36 have been added in the middle of the cable. These third and fourth terminations can simply be linked together for the tensioning process shown in FIG. 5. An extension link 42 can then be added between the third and fourth terminations to increase the length of the cable assembly to match the desired length.

Cables have been used as the examples in this disclosure, but the reader should bear in mind the fact that the principles disclosed apply to many other types of tensile members. These include synthetic rope/cable/cord grommets, choked assemblies, reeved block assemblies, and looped slings or pendants where a loop of filaments, strands, or cables are wound around two end points, and the two end points thereby become terminations.

Additionally, the inventive process is not specific to the termination type/method or length correction component. The examples are merely meant to represent a design based on certain termination configurations. These designs are not to be viewed as limiting, like that of the tensile member, they will vary broadly from application to application—and countless variations are possible.

The invention includes many other functional variations that are assumed throughout the examples, such as:

1. An embodiment in which a length-adjustment component is added to both ends of the cable. In many applications this is preferable and should be assumed to be the case in all embodiments in this disclosure. The simplified depiction of a second termination receiving a length adjustment feature is simply meant to assume that at least one end, if not both ends receive such a component;

2. An embodiment in which multiple length-adjustment components are "stacked" or otherwise configured for use on at least one end of the cable;

3. An embodiment in which the length-adjustment component is simply a modification of a component already on the cable (such as milling away a final load bearing surface or drilling a cross bore hole on the termination body itself as examples);

4. An embodiment in which the length-adjustment component is tamper resistant so that it cannot be easily modified in the field;

5. An embodiment in which the length-adjustment component is made visibly out of alignment should it be out of factory setting;

6. A configuration in which adjustment is possible in both directions, such that a tensile member can be made at the target length, and length correction can be designed to be either shorter or longer. (For example, the cable length and bushing halves 92 in FIG. 15 can be configured to first target the nominal length, and adjustments can then be made to the cable by simply using shorter or longer bushing halves 92. It need not be only adjustable in one direction as simplified in this disclosure.)

7. An embodiment in which the inventive process and length adjustment component is made to the strand or sub-rope of a larger tensile member. In most cases this would include similar length adjustment components with all or most of the loaded subcomponents. This can be used to balance subcomponents within a large assembly, just as if they were individual tension members requiring matched and stable lengths.

Although the preceding description contains significant detail, it should not be construed as limiting the scope of the invention but rather as providing illustrations of the preferred embodiments of the invention. Those skilled in the art will be able to devise many other embodiments that carry out the present invention. Thus, the language used in the claims shall define the invention rather than the specific embodiments provided.

Having described my invention, I claim:

1. A method for producing a synthetic tensile member assembly having a precise and stable length for application across a known distance, comprising:
   a. providing a synthetic tensile member having a first end and a second end;
   b. providing a first termination on said first end, said first termination having a first attachment reference;
   c. providing a second termination on said second end, said second termination having a second attachment reference;
   d. whereby said synthetic tensile member, said first termination, and said second termination are united to form said synthetic tensile member assembly;
   e. wherein an initial distance between said first and second attachment references in said synthetic tensile member assembly is less than said known distance;
   f. applying a predetermined tension profile to said synthetic cable assembly in order to increase said initial distance through a bedding process and ultimately produce a stable overall length between said first and second attachment references;
   g. determining said stable overall length between said first and second attachment references;
   h. determining an offset distance that is a difference between said known distance and said stable overall length between said first and second attachment references;
   i. providing a length adjustment component, wherein said length adjustment component is configured to attach to said second termination and add said offset distance to said second termination so that an overall length of said tensile member assembly is equal to said known distance; and
   j. attaching said length adjustment component to said second termination.

2. The method for producing a synthetic tensile member assembly as recited in claim 1, wherein:
   a. said second termination includes a posterior bearing surface; and
   b. said length-adjustment component comprises a correction block having an overhang configured to bear against said posterior bearing surface.

3. A method for producing a synthetic tensile member assembly having a precise and stable length for application across a known distance, comprising:
   a. providing a synthetic tensile member having a first end and a second end;
   b. providing a first termination on said first end, said first termination having a first attachment reference;
   c. providing a second termination on said second end, said second termination having a second attachment reference;
   d. whereby said synthetic tensile member, said first termination, and said second termination are united to form said synthetic tensile member assembly;
   e. wherein an initial distance between said first and second attachment references in said synthetic tensile member assembly is less than said known distance;
   f. applying multiple pulls to said synthetic cable assembly in order to increase said initial distance through a bedding process and ultimately produce a stable overall length between said first and second attachment references;
   g. determining said stable overall length between said first and second attachment references;
   h. determining an offset distance that is a difference between said known distance and said stable overall length between said first and second attachment references;
   i. providing a length adjustment component wherein said length adjustment component is configured to attach to said second termination and add said offset distance to said second termination so that an overall length of said tensile member assembly is equal to said known distance; and
   j. attaching said length adjustment component to said second termination.

4. The method for producing a synthetic tensile member assembly as recited in claim 3, wherein:
   a. said second termination includes a posterior bearing surface; and
   b. said length-adjustment component comprises a correction block having an overhang configured to bear against said posterior bearing surface.

* * * * *